US012521966B2

(12) United States Patent
Berzon

(10) Patent No.: US 12,521,966 B2
(45) Date of Patent: Jan. 13, 2026

(54) 2K PU-DUAL CURE ADHESIVE FOR LAMINATION

(71) Applicant: ESSILOR INTERNATIONAL, Charenton-le-pont (FR)

(72) Inventor: Ronald A. Berzon, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 524 days.

(21) Appl. No.: 17/761,280

(22) PCT Filed: Sep. 17, 2020

(86) PCT No.: PCT/EP2020/076012
§ 371 (c)(1),
(2) Date: Mar. 17, 2022

(87) PCT Pub. No.: WO2021/053089
PCT Pub. Date: Mar. 25, 2021

(65) Prior Publication Data
US 2022/0371301 A1 Nov. 24, 2022

(30) Foreign Application Priority Data
Sep. 19, 2019 (EP) ................................. 19306139

(51) Int. Cl.
| B32B 7/12 | (2006.01) |
| B32B 23/00 | (2006.01) |
| B32B 23/08 | (2006.01) |
| B32B 27/08 | (2006.01) |
| B32B 27/30 | (2006.01) |
| B32B 27/34 | (2006.01) |
| B32B 27/36 | (2006.01) |
| B32B 27/40 | (2006.01) |
| C08J 5/12 | (2006.01) |
| C09D 175/04 | (2006.01) |
| G02B 1/04 | (2006.01) |
| G02C 7/02 | (2006.01) |

(52) U.S. Cl.
CPC ............... *B32B 7/12* (2013.01); *B32B 23/00* (2013.01); *B32B 23/08* (2013.01); *B32B 27/08* (2013.01); *B32B 27/302* (2013.01); *B32B 27/308* (2013.01); *B32B 27/34* (2013.01); *B32B 27/365* (2013.01); *B32B 27/40* (2013.01); *C08J 5/128* (2013.01); *C09D 175/04* (2013.01); *G02B 1/041* (2013.01); *G02C 7/02* (2013.01); *B32B 2250/24* (2013.01); *B32B 2255/10* (2013.01); *B32B 2255/26* (2013.01); *B32B 2274/00* (2013.01); *B32B 2307/412* (2013.01); *B32B 2551/00* (2013.01); *C08J 2301/12* (2013.01); *C08J 2377/00* (2013.01); *C08J 2475/04* (2013.01); *G02C 2202/16* (2013.01)

(58) Field of Classification Search
CPC ........... B32B 7/12; B32B 23/00; B32B 23/08; B32B 27/08; B32B 27/302; B32B 27/308; B32B 27/34; B32B 27/365; B32B 27/40; B32B 2250/24; B32B 2255/10; B32B 2255/26; B32B 2274/00; B32B 2307/412; B32B 2551/00; C08J 5/128; C08J 2301/12; C08J 2377/00; C08J 2475/04; C09D 175/04; G02B 1/041; G02C 2202/16

See application file for complete search history.

(56) References Cited

U.S. PATENT DOCUMENTS

| 2004/0096666 | A1* | 5/2004 | Knox | B32B 27/40 351/41 |
| 2011/0262649 | A1* | 10/2011 | Dornbusch | C08F 2/46 524/507 |
| 2013/0216805 | A1* | 8/2013 | Yasui | B05D 5/10 359/483.01 |
| 2016/0108298 | A1* | 4/2016 | Berzon | B32B 7/12 428/354 |

FOREIGN PATENT DOCUMENTS

| EP | 0116924 | 8/1984 |
| EP | 1804088 | 7/2007 |
| EP | 1825999 | 3/2010 |
| JP | 2006227591 | 8/2006 |
| JP | 2007178920 | 7/2007 |
| JP | 2007226005 | 9/2007 |
| JP | 2008063527 A * | 3/2008 |
| WO | WO 2011161827 | 12/2011 |
| WO | WO 2015/016313 | 2/2015 |
| WO | WO 2018/147935 | 8/2018 |

OTHER PUBLICATIONS

Machine Translation of Yoshihara (JP 2008063527) (Year: 2008).*
International Search Report and Written Opinion issued in Corresponding PCT Application No. PCT/EP2020/076012, dated Jan. 19, 2021.
Office Action issued in corresponding Japanese Application No. 2022-517437, dated Feb. 27, 2024.

* cited by examiner

*Primary Examiner* — Callie E Shosho
*Assistant Examiner* — Bethany M Miller
(74) *Attorney, Agent, or Firm* — Norton Rose Fulbright US LLP

(57) ABSTRACT

Disclosed herein are a two-component polyurethane adhesive and a dual cure polyurethane-based adhesive for use in laminated films. The adhesives are particularly useful for producing photochromic and clear-to-polarized laminates for ophthalmic lens applications.

10 Claims, No Drawings

2K PU-DUAL CURE ADHESIVE FOR LAMINATION

CROSS-REFERENCE TO RELATED APPLICATIONS

This application is a national phase application under 35 U.S.C. § 371 of International Pat. App. No. PCT/EP2020/076012 filed Sep. 17, 2020, which claims priority to EP patent application Ser. No. 19/306,139.7 filed Sep. 19, 2019. The entire contents of each disclosure is specifically incorporated by reference herein without disclaimer.

FIELD OF THE INVENTION

The invention relates to adhesive systems for functional laminates that can be used in ophthalmic lens applications.

BACKGROUND

Optical properties of ophthalmic lenses can be modified by incorporating a film in a lens. These films are often referred to as functional films, and impart various optical functionalities to a base ophthalmic lens. Clear films that include photochromic dyes, for example, can automatically darken when exposed to sunlight. This process is reversible, and the photochromic film returns to a clear state when it is placed indoors. Photochromic films have found use in prescription lenses and temporarily darken the lenses into sunglass-like lenses. This variable-darkness functionality is consumer-friendly because a prescription spectacle-user does not have to purchase a separate pair of prescription sunglasses.

A relatively new development in functional films involves non-polarized films that reversibly transform into polarized films when exposed to ultraviolet (UV) rays such as those found in sunlight. These clear-to-polarized functional films return to a non-polarized state when UV rays are not present, such as when placed indoors and away from sunlight. Until recently, polarization only existed as static film embedded in or on a lens. Clear-to-polarized (C2P) functional films can be provided in combination with photochromic films to provide prescription lenses that provide the reduced-transmissive effects of sunglasses as well as the glare-reducing benefits of polarized lenses.

Photochromic (PhCh) semi-finished lenses can be made by a casting process or by injection molding of a thermoplastic resin, such as polycarbonate (PC), behind a thermoplastic photochromic laminate. Polarized semi-finished lenses can also be made by injection molding a thermoplastic resin, such as PC, behind a thermoplastic polarizing laminate. Clear-to-polarized semi-finished lenses can be made by a casting process or by a post-injection molding process where a thermoplastic resin, such as polycarbonate (PC), is injection molded to first make a lens, then a C2P laminate is thermally attached to the front of the PC lens with an adhesive using residual injection mold heat. Photochromic, polarized, and clear-to-polarized laminates can be attached to the front side of a lens using pressure sensitive adhesives (PSA).

Photochromic and clear-to-polarized compositions are customarily provided in very flexible thermoplastic polyurethane (TPU) or thermoplastic elastomer (TPE) films. These films have no mechanical stiffness and cannot be formed to maintain any type of physical shape. To solve these problems, the functional film needs to be laminated so that it can be isolated from the casting environment and formed to a spherical or non-spherical shape. A good adhesive is needed to hold the multilayer laminate together during manufacturing, handling, transport, and casting or injection molding.

SUMMARY

The inventor has found that the adhesives disclosed herein can be used to produce laminates having photochromic and/or clear-to-polarized films. The adhesives exhibit satisfactory preliminary adhesive strength (green strength) and, as a result, maintain their integrity during the lamination process. The adhesives disclosed herein include a two-component polyurethane adhesive and a dual cure polyurethane-based adhesive. These adhesives can be used in batch or roll-to-roll processes for producing photochromic and/or clear-to-polarized functional films.

Some aspects of the disclosure are directed to a functionalized optical article comprising an optical lens comprising at least one polymerized monomer or thermoplastic material, a functional multilayer laminate comprising a functional film a first thermoplastic film positioned on one side of the functional film and a second thermoplastic film on the opposite side of the functional film, and a laminating adhesive disposed between the functional film and the first thermoplastic film, and between the functional film and the second thermoplastic film. In some embodiments, the functionalized optical article is as described in the claims.

In some embodiments, the functional film comprises a photochromic material, a dichroic material, a photochromic-dichroic material, or a combination thereof. In some aspects, the functional film is selected from the group consisting of a stretched thermoplastic elastomer film, a non-stretched thermoplastic elastomer film, a stretched thermoplastic urethane film, and a non-stretched thermoplastic urethane film. The first and second thermoplastic films each independently comprise a material selected from the group consisting of cellulose triacetate (TAC), polycarbonate (PC), polyacrylate, poly methacrylate (PMMA), polystyrene methylmethacrylate (PSMMA), polymethylmethacrylate acrylonitril butadiene styrene (PMABS), cyclic olefin copolymer (COC), polyester, polyethylene terephthalate (PET), polyethylene tereohthalate glycol (PETG), polyamide (nylon), and polystyrene (PS).

In some embodiments, prior to curing, the adhesive consists of at least one polyisocyanate, at least one polyol, and optionally a catalyst. This adhesive is referred to herein as a two-component polyurethane adhesive. In some embodiments, the at least one polyol has a functionality of at least 2. The at least one polyol is selected from the group consisting of a polyester polyol, a polyether polyol, a polyol containing an amide group, a polyacrylate polyol, an epoxy polyol, a polyvinyl polyol, a urethane polyol, and mixtures thereof.

In other embodiments, the adhesive comprises, prior to curing, at least one polyisocyanate compound, at least one polyol, at least one polymerization initiator, at least one aliphatic urethane acrylate, at least one acrylate monomer, and optionally a catalyst. This adhesive is referred to herein as a polyurethane-based adhesive, and is obtained by reacting the components listed above. In some embodiments, the polyurethane-based adhesive is used to adhere a functional film to a thermoplastic film or films. In some embodiments, the aliphatic urethane acrylate has a functionality of at least 2. In some aspects, the aliphatic urethane acrylate is a hydroxy-functionalized acrylate. In some aspects, the at least one polyol is a polyester polyol, a polyether polyol, a polyol containing an amide group, a polyacrylate polyol, an epoxy polyol, a polyvinyl polyol, a urethane polyol, or a mixture of two or more such polyols. In some embodiments, the at least one acrylate monomer is selected from the group consisting of 2-phenoxyethyl acrylate, benzyl methacrylate, isobornyl acrylate, neopentyl glycol diacrylate, and 1,3-butyleneglycol dimethacrylate.

Some embodiments of the disclosure are directed to a polyurethane-based adhesive comprising, prior to curing, at least one polyisocyanate compound, at least one polyol, at least one polymerization initiator, at least one aliphatic urethane acrylate, at least one acrylate monomer, and optionally a catalyst. Some aspects of the disclosure are directed to a roll-to-roll lamination process wherein the polyurethane-based adhesive obtained by reacting at least one polyisocyanate compound, at least one polyol, at least one polymerization initiator, at least one aliphatic urethane acrylate, at least one acrylate monomer, and optionally a catalyst, is used to adhere two or more films in the roll-to-roll lamination process. The two-component polyurethane adhesive or the polyurethane-based adhesive disclosed herein can be used in batch or roll-to-roll processes for producing photochromic and/or clear-to-polarized functional films.

"Ophthalmic lens," according to the disclosure, is defined as a lens adapted, namely for mounting in eyeglasses, whose function is to protect the eye and/or to correct vision. This lens can be an afocal, unifocal, bifocal, trifocal, or progressive lens. The ophthalmic lens may be corrective or un-corrective. Eyeglasses wherein ophthalmic lenses will be mounted could be either a traditional frame comprising two distinctive ophthalmic lenses, one for the right eye and one for the left eye, or like mask, visor, helmet sight or goggle, wherein one ophthalmic lens faces simultaneously the right and the left eyes. Ophthalmic lenses may be produced with traditional geometry as a circle or may be produced to be fitted to an intended frame. Ophthalmic lenses may be made of thermoset or thermoplastic materials.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%. The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes a process that employs the urethane-based adhesive disclosed herein in a laminate-manufacturing process.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Functionality (fn) is the average number of a particular species of a functional group that reside on a molecule. For example, a polyol having a functionality of 2 refers to a molecule that, on average, includes two hydroxyl groups per molecule. An aliphatic urethane acrylate may be characterized by the number of unsaturated acrylate groups per molecule. A mono-acrylate molecule only contains one unsaturated acrylate group. A di-acrylate contains two unsaturated acrylate groups. Any material with functional groups can be defined by its Equivalent Weight (Ew).

A polyol is a compound that contains at least two hydroxy (OH) functional groups per molecule. A polyol can be characterized by the amount in percentage (%), of the hydroxyl groups (OH) in the material (% OH). A polyol can characterized by its hydroxyl number (OH#), which is the number of milligrams of potassium hydroxide (KOH) required to neutralize the acetic acid taken up on acetylation of one gram of a chemical substance that contains free hydroxyl groups. The molecule can be referred to as an Equivalent Weight (Ew), which is the molecular weight (Mw) of a polyol containing only one OH functional (fn) group. The equation is Ew=Mw/fn. Exemplary polyols include ethylene glycol, 1,2-propanediol, 1,3-propanediol, glycerine, butanediol, hexanediol, neopentyl glycol, trimethylol propane, poly(propyleneoxide)diol, poly(propyleneoxide)triol, copoly(ethyleneoxide-propyleneoxide)diol, poly(tetramethyleneoxide)diol, bisphenol A ethoxide, bisphenol S ethoxide, Spiroglycol, caprolactonedenatured diol, carbonatediol, trimethylolpropane, pentaerythritol, polyester polyols, polyether polyols, polyacrylic polyols, polybutadiene polyols, polycarbonate polyols, homopolymers or copolymers of polyethylene and polypropylene glycol.

A polyisocyanate is a compound that includes at least two isocyanate (NCO) functional groups per molecule. A polyisocyanate can be characterized by the amount in percentage (%), of the isocyanate group (NCO) in the material (%NCO) and by Ew. Examples of suitable polyisocyanates include, but are not limited to, 1,5-naphthylene diisocyanate, 2,2-, 2,4- and 4,4'-diphenylmethane diisocyanate (MDI), hydrogenated MDI (HMDI), allophanates of MDI, xylylene diisocyanate (XDI), tetramethyl xylylene diisocyanate (TMXDI), 4,4'-diphenyl dimethylmethane diisocyanate, di- and tetraalkyl diphenylmethane diisocyanate, 4,4'-dibenzyl diisocyanate, 1,3-phenylene diisocyanate, 1,4-phenylene diisocyanate, the isomers of toluene diisocyanate (TDI), 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1.5.5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid-bis-isocyanatoethyl ester, diisocyanates containing reactive halogen atoms, such as 1-chloromethylphenyl-2,4-diisocyanate, 1-bromomethylphenyl-2,6-diisocyanate or 3,3-bis-chloromethylether-4,4'-di-phenyl diisocyanate. Other suitable diisocyanates are, for example, trimethylhexamethylene diisocyanate, 1,4-diisocyanatobutane, 1,12-diisocyanatododecane, dimer fatty acid diisocyanate. Additional exemplary diisocyanates include tetramethylene, hexamethylene, undecane, dodecamethylene, 2,2,4-trimethylhexane, 2,3,3-trimethylhexamethylene, 1,3-cyclohexane, 1,4-cyclohexane, 1,3- and 1,4-tetramethyl xylene, isophorone, 4,4-dicyclohexanemethane and lysine ester diisocyanates.

A polyurethane is formed by reacting one or more polyisocyanates, such as a diisocyanate, with one or more polyols. A polyurethane-based adhesive, as disclosed herein, is formed by reacting one or more polyisocyanates, one or more polyols, a polymerization initiator, at least one aliphatic urethane acrylate, and at least one acrylate monomer. Formation of the polyurethane or polyurethane-based adhesive may further involve the inclusion of a catalyst in the formation reaction. The relative amount of polyisocyanate and polyol is referred to as the isocyanate:hydroxyl (NCO:OH) ratio. The NCO:OH ratio is defined as the number of moles of isocyanate groups to the number of moles of hydroxyl groups in a polyurethane-forming or polyurethane-based adhesive-forming reaction.

Non-limiting examples of acrylate monomers include, methyl methacrylate, ethyl methacrylate, propyl methacrylate, butyl methacrylate, hexyl methacrylate, octyl methacrylate, decyl methacrylate, lauryl methacrylate, stearyl methacrylate, neopentyl methacrylate, 2-ethylhexyl methacrylate, 2-hydroxyethyl methacrylate, 2-hydroxypropyl methacrylate, methacrylonitrile, glycidyl methacrylate, ethoxytriethyleneglycol methacrylate, 2-ethoxyethyl methacrylate, isobornyl methacrylate, pentaerithritol methacrylate, benzyl methacrylate, p-tolyl methacrylate, phenyl methacrylate, phenoxyethyl methacrylate, naphthyl methacrylate, methyl acrylate, ethyl acrylate, propyl acrylate, butyl acrylate, hexyl acrylate, octyl acrylate, decyl acrylate, lauryl acrylate, stearyl acrylate, neopentyl acrylate, 2-ethylhexyl acrylate, 2-hydroxyethyl acrylate, 2-hydroxypropyl acrylate, acrylonitrile, glycidyl acrylate, ethoxytriethyleneglycol acrylate, 2-ethoxyethyl acrylate, isobornyl acrylate, pentaerithritol acrylate, benzyl acrylate, p-tolyl acrylate, phenyl acrylate, phenoxyethyl acrylate, naphthyl acrylate, neopentyl diglycol diacrylate, di-acrylates, tri-acrylates, tetra-acrylates, penta-acrylates, polyacrylates, and mixtures thereof.

The polymerization initiator generates or liberates free radicals upon addition to the compositions of energy such as thermal energy, actinic radiation, or electron beam radiation. Addition of energy to a polymerization initiator induces generation or liberation of free radicals, which in turn, react with a reactive monomer to initiate the polymerization process.

Thermally-activated free-radical polymerization initiators include organic peroxides, organic hydroperoxides, azo initiators and other known initiators, such as peroxide polymerization initiators, such as methyl ethyl ketone peroxide, methyl isobutyl ketone peroxide, cyclohexanone peroxide, methyl cyclohexanone peroxide, isobutyryl peroxide, 3,5,5-trimethylhexanoyl peroxide, lauroyl peroxide, benzoyl peroxide, di-tert-butyl peroxide, tert-butyl-α-cumyl peroxide, di-α-cumyl peroxide, 1,4-bis[(tert-butylperoxy)isopropyl] benzene, 1,3-bis[(tert-butylperoxy)isopropyl]benzene, 2,5-dimethyl-2,5-bis(tert-butylperoxy)hexane, 2,5-dimethyl-2,5-bis(tert-butylperoxy)-3-hexyne, 1,1-bis(tert-butylperoxy)-3,3,5-trimethylcyclohexane, n-butyl-4,4-bis(tert-butylperoxy)valerate, 2,2-bis(tert-butylperoxy)butane, tert-butylperoxy acetate, tert-butylperoxy isobutylate, tert-butylperoxy octoate, tert-butylperoxy pivalate, tert-butylperoxy neodecanoate, tert-butylperoxy-3,5,5-trimethyl hexanoate, tert-butylperoxy benzoate, tert-butylperoxy laurate, 2,5-dimethyl-2,5-bis(benzoylperoxy)hexane, bis(2-ethylhexyl)peroxy dicarbonate, diisopropylperoxy dicarbonate, di-sec-butylperoxy dicarbonate, di-n-propylperoxy dicarbonate, bis(3-methoxybutyl)peroxy dicarbonate, bis(2-ethoxyethyl)peroxy dicarbonate, bis(4-tert-butylcyclohexyl) peroxy dicarbonate, O-tert-butyl-O-isopropylperoxy carbonate, and succinic acid peroxide, tert-butyl hydroperoxide, cumene hydroperoxide, diisopropylbenzene hydroperoxide, p-methane hydroperoxide, 1,1,3,3-tetramethylbutyl hydroperoxide; azo polymerization initiators, such as 2,2'-azobis(isobutyronitrile), 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 4,4'-azobis(4-cyanovaleric acid); inorganic peroxides, such as potassium persulfate and sodium persulfate; and the like.

The preferred free-radical polymerization initiators for use herein are photopolymerization initiators which release free-radicals when the compositions of this invention are irradiated with suitable electromagnetic radiation (ultraviolet). Useful photopolymerization initiators include but are not limited to 1-hydroxy-cyclohexyl-phenyl ketone, 3-hydroxyphenyl methyl ketone, 2-Hydroxy-2-methyl-1-phenyl-1-propanone, 2,2-dimethoxy-1,2-diphenylethan-1-one, 2-hydroxy-1-(4-[4-(2-hydroxy-2-methyl-propionyl)-benzyl]-phenyl)-2-methylpropan-1-one, 2-hydroxy-1-[4-(2-hydroxyethoxy)phenyl]-2-methyl-1-propanone, bis(2,4,6-trimethylbenzoyl)-phenylphosphine oxide, and diphenyl(2,4,6-trimethylbenzoyl)-phosphine oxide. These polymerization initiators may be used alone, in combination with one or more other polymerization initiators, or in combination with one or more thermal initiators. It may also be possible to use a polymerization initiation system by ultraviolet irradiation, electron irradiation, X-ray irradiation, radiation irradiation, or the like. With respect to polymerization initiation methods, the methods described in Moad and Solomon "The Chemistry of Free Radical Polymerization", Pergamon, London, 1995, pp. 53-95 may be employed.

The amount of the polymerization initiator used is not particularly limited. In order to control the amount of radical species generated during polymerization, in addition to the control of the amount of the polymerization initiator, preferably, temperature is controlled in the case of the thermal polymerization initiator which causes thermal dissociation, or the amount of energy is controlled in the case of the polymerization initiation system which generates radicals by light, ultraviolet light, electron beams, or the like.

The reaction that forms the two-component polyurethane adhesives or the polyurethane-based adhesives may be catalyzed with known, conventional catalysts used for this purpose. Exemplary, non-limiting catalysts include dibutyl tin dilaurate; dibutyl tin maleate; dibutyl tin dilauryl mercaptide; dimethyl tin dichloride; dibutyl tin dichloride; dibutyl tin diacetate; stannous octoate; stannous naphthenate; stannous oxalate; stannous stearate; cadmium octoate; bismuth stearate; zinc octoate; cobalt naphthenate; bismuth nitrate; bismuth carboxylate; zirconium octoate; triphenyl antimony dichloride, and the like.

The polyurethane-based adhesive includes UV radiation-curable components and thermally-curable components, and is therefore cured using a dual-cure method. The term "dual cure" means that the adhesive undergoes a first cure, followed by a second cure. Additionally, when monomer species cure independently distinct of each other, an interlocking interpenetrating network (IPN) results. A sequential IPN is where a first monomer, crosslinker and curing agent is polymerized and then a second same or different monomer, crosslinker and curing agent is polymerized. For example, a first mixture of monomers, crosslinker and curing agent is first polymerized for example by UV, and the network, swollen with a second same or different monomer, crosslinker and curing agent, are polymerized for example thermally, to form an IPN. Each polymerization makes a separate crosslinked polymer network where the two networks are entangled. A simultaneous IPN is where two different monomers, crosslinkers and curing agents polymerize by two different non-interferring cure mechanisms. The cure mechanism of the first polymerization being different than the polymerization mechanism of the second polymerization allows two independent entangled polymer networks to be formed. For example, a formulation comprising a first group of acrylic monomers, crosslinker and organic peroxide curing agent and a second group of condensation monomers, crosslinkers and cure agent, are polymerized at the same time by a thermal mechanism to form two independent entangled cross-linked polymers that are not connected to each other. However, if an ingredient of the first group has a function that can allow it to react with the second group, some connectivity of the first cross-linked polymer network and the second cross-linked polymer network can occur. Without wishing to be bound by theory, it is believed that the first cure provides a first level of cure, creating some polymer species, and pre-sets the adhesive; the second cure sets the adhesive to provide a strong final adhesion. The first cure can be accomplished by exposing the uncured adhesive to heat, ultraviolet radiation, and/or electron beam radiation. The first cure permits near-instantaneous development of bond strength sufficient to secure one substrate to another. The preliminary adhesion established by the first cure is referred to as green strength, and can be quanitified using a peel strength test, e.g., ASTM D1876 Adhesive Peel Strength Test. The second cure may be accomplished by exposure to radiating energy that is different from the one used in the first cure. If ultraviolet radiation, and/or electron beam radiation is used in the first cure, then heat can be used for the second cure, and vice-versa. In preferred embodiments, ultraviolet radiation is used for the first cure, and heat is used for the second cure. The second cure sets the adhesive to provide a strong final adhesion. In the event that ultraviolet radiation and/or electron is used for the first cure, allowing the adhesive to sit for an extended period of time at room temperature (e.g., at least one day) may be used as a condition to affect the second cure. In some embodiments, the polyurethane-based adhesive is exposed to first and second curing conditions, and subsequently allowed to sit for an extended period of time to reach a fully-cured state. A dual cure adhesive's potlife is sufficiently long that the adhesive can be readily adapted for use in conventional film laminate processes and equipment. Additionally, the adhesive may be formulated to be free of solvent (thereby avoiding emission issues), yet maintain a viscosity sufficiently low as to permit easy handling and application.

In some embodiments, the functional film disclosed herein comprises a photochromic material, a dichroic material, a photochromic-dichroic material, or a combination thereof. The inclusion of photochromic material in a film allows the film to reversibly change from a first clear (colorless) transparent state to a second, darker or colored transparent state upon exposure to a given frequency of light. The given frequency of light reversibly activates a chemical species to transform between two forms having different absorption spectra. Upon removal or reducing the intensity of the given frequency of light below a threshold value, the film changes color or bleaches back to its original, non-activated clear (colorless) state. The inclusion of a photochromic-dichroic material in a film allows the film to reversibly change the degree to which it filters plane-polarized light like glare. A film having photochromic-dichroic material, upon exposure to actinic radiation, becomes colored and polarizing. Alignment of the molecules allows the film to transmit the light rays whose plane of oscillation is not parallel with the molecule alignment. In a practical sense, horizontal molecular alignment reduces the amount of horizontal glare that is transmitted through the film and reaches the eye. Examples of photochromic-dichroic materials are included in U.S. Pat. No. 7,256,921, the entirety of which is incorporated by reference.

EXAMPLES

A. Polyurethane Adhesives (Two-Component Adhesives)

Example 1

Polyol 1 (OH value of 540 mg KOH/g, mean molecular weight 240 g/mol, mixed functionality of 2.4, viscosity 300 cP @ 20° C.) and Polyisocyanate 1 (NCO content 19.0-

21.0%, viscosity 2,400-3,600 cP @ 23° C.) were weighed out to provide a NCO to OH molar ratio of 1.5:1 NCO to OH. The polyisocyanate and polyol were added to a clear glass vial, mixed well, then vacuum degassed ~1 hour until the bubbling subsided.

A cellulose triacetate sheet was treated in a 10% caustic for 4 minutes at 60° C., rinsed in deinoized water, then dried for 15 minutes at 50° C. A thermoplastic polyamide-polyether block elastomer (TPE) was oriented by stretching ~4:1, washed, and dried.

A multilayer composite comprising two support layers of TAC and the oriented TPE sheet was manually laminated, using the polyol/polyisocyanate (polyurethane) adhesive described above, between rubber rollers at ~20 psig and cured from 60-80° C., over ~24 hours. The resulting TAC/TPE/TAC laminate had an acceptable cured adhesion with a Peel Force of 11.5 N/inch. A primer was applied onto the laminate, a disc was die-cut and cast in allyl diglycol carbonate (CR39). Lens adhesion was excellent, no delamination of the laminate within the lens was observed even after surfacing and edging. The remaining adhesive in the glass vial was cured overnight at 60° C. The resulting bulk cure adhesive was clear and hard.

Example 2

Same components and conditions as Example 1 except that the NCO to OH molar ratio is 2:1. The resulting laminate had an acceptable cured adhesion with a Peel Force of 12-14 N/inch. The bulk cure adhesive was transparent and rubbery hard.

Example 3

Same components and conditions as Example 1 except that the NCO to OH molar ratio is 3:1. The resulting TAC/TPE/TAC laminate had a Peel Force of <10 N/inch, which is peelable by hand. The bulk cured adhesive was transparent and soft. NCO:OH ratios of 1:1 or less are expected to limit or eliminate free NCO functional groups required to bond with the TAC and TPE. NCO:OH ratios of >3:1 cure to a softer bulk material and an excess of un-reacted NCO could discolor over time. The Peel Strength was not measured as the sample had poor cured adhesion and could be easily peeled by hand, a condition that is generally understood to be <10 N/inch.

TABLE 1

| TAC Laminates | | | |
| --- | --- | --- | --- |
| | Example 1 | Example 2 | Example 3 |
| Polyol 1 | 1.234 | 0.986 | 1.406 |
| Isocyanate 1 | 3.766 | 4.014 | 8.594 |
| NCO:OH ratio | 1.5:1 | 2:1 | 3:1 |
| Adhesive bulk cure | hard | hard, rubbery | soft |
| Clarity | transparent | transparent | transparent |
| TAC Thickness (μm) | 80 | 80 | 190 |
| Adhesion (N/inch) | 11.5 (acceptable) | 12-14 (acceptable) | <10* (poor) |

*Estimated.

Example 4

Same components and conditions as Example 1 except that a different polyisocyanate (Polyisocyanate 2 with NCO content 23.0% and viscosity 2,500 cP @ 23° C.) was used in the formulation. The bulk cure of the adhesive is transparent. A primer was applied onto the laminate, a disc was die-cut and cast in CR39. The cured laminate showed excellent hand peel adhesion with no delamination. Lens polarizing performance was rated as good with an average degree of polarization (DP)=85.

Example 5

Same components and conditions as Example 1 except that Polyisocyanate 3 (NCO content 21.8, viscosity 2,500 cP @ 25° C.) was used in the formulation. The cured laminate adhesion was poor and was easily peeled apart by hand. The bulk cure adhesive was opaque.

Example 6

Same components and conditions as Example 1 except that Polyisocyanate 4 (aliphatic polyisocyanate with NCO content 11.9%, viscosity 600 cP @ 23° C.) was used in the formulation. The cured laminate adhesion was poor, as the laminate was easily peeled apart by hand. The bulk cure adhesive was hazy.

Example 7

Same components and conditions as Example 1 except that Polyisocyanate 5 (a blend of cycloaliphatic polyisocyanate A with NCO content 17-17.6% and aliphatic polyisocyanate B with NCO content 21.8% and viscosity 3,000 cP @ 23° C.; overall NCO content 21.0%) was used. The cured laminate adhesion was poor, as the laminate was easily peeled apart by hand. The bulk cure adhesive was hazy.

Example 8

Same components and conditions as Example 1 except that Polyisocyanate 6 (NCO content 21.8%, viscosity 3,000 cP @ 23° C.) was used. The cured laminate adhesion was poor, with a Peel Force of 7.5 N/inch. The bulk cure adhesive was hazy.

Example 9

Same components and conditions as Example 4 except that except lamination was scaled up and run on a roll to roll laminator. A larger adhesive batch was prepared mixing Polyol 1 (79 g) and Polyisocyanate 2 (236 g) in a glass jar. All ingredients were vacuum degassed for ~30 minutes, until the bubbles subsided. A TAC film (80 nm) was treated in 18% caustic for 4 minutes at 45° C., triple rinsed with deionized water, and dried at 0.8 m/min through an oven (~4 minutes) at 80° C. A TPE film was stretched to ~4 to 1 with a thickness of about ~40 nm.

TAC/TPE/TAC and adhesive were laminated at the wet bond nip on a roll to roll laminator at a line speed of ~0.4-0.5 m/min then travelled through an oven at 130° C. (~6-7.5 mins). Upon exiting the horizontal oven, the adhesive was uncured and wet, and the laminate could be easily pulled apart. The laminate subsequently traveled over several rollers. The first idler roller (6 inch) changes the laminate direction 90-degrees to a vertical downward direction, while a second driven nip roller (6 inch) further changes the laminate direction 90-degrees back to a horizontal direction. At this point the laminate is sheeted and collected.

TABLE 2.1

|  | Example 4 | Example 5 | Example 6 |
|---|---|---|---|
| Polyol 1 | 1.642 | 1.316 | 0.600 |
| Polyisocyanate 2 (23.0% NCO) | 4.358 | — | — |
| Polyisocyanate 3 (21.8% NCO) | — | 3.684 | — |
| Polyisocyanate 4 (11.8% NCO) | — | — | 4.400 |
| NCO:OH | 1.5:1 | 1.5:1 | 1.5:1 |
| Cured adhesive | clear | opaque | hazy |
| Laminate Adhesion | good | poor | poor |

TABLE 2.2

|  | Example 7 | Example 8 | Example 9 |
|---|---|---|---|
| Polyol 1 | 1.266 | 1.316 | 79 |
| Polyisocyanate 5 (21% NCO) | 3.734 | — | — |
| Polyisocyanate 6 (21.8% NCO) | — | 3.684 | — |
| Polyisocyanate 2 (23.0% NCO) | — | — | 236 |
| NCO:OH | 1.5:1 | 1.5:1 | 1.5:1 |
| Cured adhesive | hazy | hazy | clear |
| Laminate Adhesion | poor | poor | n/a |

B. Polyurethane-Based Adhesives (Dual Cure Adhesives)

Example 10

Urethane Acrylate 1 (a hydroxy functional aliphatic urethane triacrylate, 0.50 g) and Polyol 1 (1.368 g) were weighed out into a brown glass vial. Acrylate Monomer 1 (a neopentyldiglycol diacrylate, 0.110 g) and Photoinitiator 1 (0.044 g) were added and mixed well until dissolved. Polyisocyanate 2 (3.632 g) was added and mixed well. The solution was vacuum degassed until the bubble subsided. TAC was manually laminated with a stretched photochromic-dichroic TPE film using a 2-roller laminator then exposed to UV (H+ bulb) in a Fusion at ~22 feet/minute on each side. The adhesive was allowed to cure for 5 days at room temperature. The laminate adhesion was acceptable. The laminate was clear, no stripe defect was seen, and the DP was good.

Example 11

Same components and conditions as Example 10 except that Urethane Acrylate 1 was replaced with Urethane Acrylate 2 (a carboxy-functional polyester acrylate). The laminate adhesion was acceptable. The laminate was clear, although a few stripe defects were observed, and the DP was good.

Example 12

Same components and conditions as Example 10 except that Urethane Acrylate 1 was replaced with Urethane Acrylate 3 (a urethane diacrylate oligomer). The laminate adhesion was acceptable. The laminate had a light milky haze and stripe defects were observed. The DP was good.

Example 13

Same components and conditions as Example 10 except that Urethane Acrylate 1 was replaced with Urethane Acrylate 4 (aliphatic urethane diacrylate oligomer). The laminate adhesion was acceptable. The laminate had a milky haze and no stripe defect was observed. The DP was good.

Example 14

Same components and conditions as Example 10 except that Urethane Acrylate 1 was replaced with Urethane Acrylate 5 (aliphatic polyester based urethane diacrylate oligomer). The laminate adhesion was acceptable. The laminate was clear and no stripe defect was seen. The DP was good.

Example 15

Same components and conditions as Example 10 except that Urethane Acrylate 1 was replaced with Urethane Acrylate 6 (a urethane diacrylate oligomer). The laminate adhesion was acceptable. The laminate was clear and no stripe defect was seen. The DP was good.

Example 16

Same components and conditions as Example 10 except that Urethane Acrylate 1 was replaced with Urethane Acrylate 7 (a urethane diacrylate oligomer). The laminate was opaque.

Example 17

Same components and conditions as Example 14 except that the amount of Acrylate Monomer 1 was reduced to 0.50 g, and the amount of Photoinitiator 1 was reduced to 0.0165 g. The laminate adhesion was good and no stripe defect was observed.

TABLE 3.1

| | Urethane Acrylate | | | Peel | | DP after 3 |
|---|---|---|---|---|---|---|
| Example | Description | Acrylic fn | —OH fn | Clarity | Force (N/inch) | DP | hrs at 100° C. |
| 10 | Urethane Acrylate 1 | 3 | 3 | clear | 26 | 92.5 | 92.0 |
| 11 | Urethane Acrylate 2 | 1 | 0 | clear | 30 | 97.0 | — |
| 12 | Urethane Acrylate 3 | 2 | 0 | light milky | 40 | 96.8 | 96.7 |
| 13 | Urethane Acrylate 4 | 2 | 0 | milky | — | 96.9 | 96.3 |
| 14 | Urethane Acrylate 5 | 2 | 0 | clear | 36 | 96.1 | 95.3 |

TABLE 3.1-continued

| Example | Description | Urethane Acrylate Acrylic fn | —OH fn | Clarity | Peel Force (N/inch) | DP | DP after 3 hrs at 100° C. |
|---|---|---|---|---|---|---|---|
| 15 | Urethane Acrylate 6 | 2 | 0 | clear | 10 | 96.7 | 96.0 |
| 16 | Urethane Acrylate 7 | 2 | 0 | opaque | — | — | — |
| 17 | Urethane Acrylate 5 | 2 | 0 | clear | — | — | — | fn = functionality
# of specified functional groups per monomer/oligomer
DP = degree of polarization

TABLE 3.2

| Example | Urethane Acrylate | Viscosity (60° C.) | Tg (° C.) |
|---|---|---|---|
| 10 | Urethane Acrylate 1 | ~40,000 | 33 |
| 11 | Urethane Acrylate 2 | 4k-10k at 25° C. | 39 |
| 12 | Urethane Acrylate 3 | 20.000 | -3 |
| 13 | Urethane Acrylate 4 | 21,000 | -76 |
| 14 | Urethane Acrylate 5 | 58,000 | -38 |
| 15 | Urethane Acrylate 6 | 19,000 | -29 |
| 16 | Urethane Acrylate 7 | 45,000 | -55 |
| 17 | Urethane Acrylate 5 | 58,000 | -38 |

Example 18

Same components and conditions as Example 10 except that the dual-cure adhesive was used on a roll to roll laminator. Acrylate Monomer 1 (4 g), Polyol 1 (46.4 g), Urethane Acrylate 1 (20 g) and Photoinitiator 1 (1.68 g) were weighed out into a brown glass bottle and mixed until dissolved. Polyisocyanate 2 (133.6 g) was added and mixed well. All ingredients were vacuum degassed for ~30 minutes, until the bubble subsided.

A TAC/TPE/TAC laminate was made on a roll to roll laminator at a line speed of ~0.4-0.5 m/min. After the nip, the TAC/TPE/TAC laminate was first pre-cured by passing through an upper and lower UV lamp. The laminate then travelled through an oven at 130° C. (~6-7.5 mins). Upon exiting the horizontal oven, the adhesive was soft cured and not wet. The laminate adhesion was good, and was conveyed over two additional 6 inch rollers then collected. The first idler roller changes the laminate direction from horizontal to vertical downward. A second driven nip roller further changes the laminate direction back to horizontal. The laminate was immediately sheeted at this point with no issues and allowed to achieve a full cure over 5 days. This polyurethane-based dual-cure adhesive provides satisfactory green adhesion for a laminate manufactured on a roll to roll process.

Example 19

Same components and conditions as Example 10. Urethane Acrylate 1 (0.50 g) and Polyol 1 (1.130 g) were weighed out into a brown glass vial. Acrylate Monomer 1 (0.10) and Photoinitiator 1 (0.042 g) were added and mixed well until dissolved. Polyisocyanate 2 (3.371) was added and mixed well. The solution was vacuum degassed until the bubble subsided. TAC was manually laminated with a PhCh TPU film using a 2-roller laminator then exposed two exposures per side (two runs) to UV (H+ bulb) in a Fusion at ~24 feet/minute on each side. The adhesive was allowed to cure for 5 days at room temperature. The laminate was yellow in color.

Example 20

Same components and conditions as Example 19 except that Photo Initiator 1 was replaced by an equimolar amount of Photo Initiator 2 (0.034 g). The laminate exhibited a fainter yellow color than Example 19.

Example 21

Same components and conditions as Example 19 except that Photo Initiator 1 was replaced by an equimolar amount of Photo Initiator 3 (0.016 g). The laminate was colorless.

Example 22

Same components and conditions as Example 19 except that Photo Initiator 1 was replaced by an equimolar amount of Photo Initiator 4 (0.026 g). The laminate was colorless.

TABLE 4

| Example | P.I. | Laminate b* | Laminate appearance |
|---|---|---|---|
| 19 | 1 | 4.2 | Yellow |
| 20 | 2 | 3.5 | <Ex 19 |
| 21 | 3 | 2.9 | Colorless |
| 22 | 4 | 2.9 | Colorless |

The claims are not to be interpreted as including means-plus- or step-plus-function limitations, unless such a limitation is explicitly recited in a given claim using the phrase(s) "means for" or "step for," respectively.

The invention claimed is:

1. A functionalized optical article comprising:
    an optical lens comprising at least one polymerized monomer or thermoplastic material;
    a functional multilayer laminate comprising a functional film, a first thermoplastic film positioned on one side of the functional film, and a second thermoplastic film positioned on the opposite side of the functional film; and
    a laminating adhesive disposed between the functional film and each of the first and second thermoplastic films, wherein the laminating adhesive comprises an interlocking interpenetrating network comprising two distinct crosslinked polymer networks;
    said laminating adhesive comprising, prior to curing:
        thermally curable components including at least one polyisocyanate and at least one polyol;
        at least one photopolymerization initiator; and
        UV radiation-curable components including at least one aliphatic urethane acrylate and at least one acrylate monomer;

wherein the laminating adhesive optionally comprises a polyurethane forming catalyst.

2. The functionalized optical article of claim 1, wherein the at least one aliphatic urethane acrylate has a functionality of at least 2.

3. The functionalized optical article of claim 1, wherein the at least one aliphatic urethane acrylate is a hydroxy-functionalized acrylate.

4. The functionalized optical article of claim 1, wherein the at least one polyol is a polyester polyol, a polyether polyol, a polyol containing an amide group, a polyacrylate polyol, an epoxy polyol, a polyvinyl polyol, a urethane polyol, or a mixture of two or more such polyols.

5. The functionalized optical article of claim 1, wherein the at least one acrylate monomer is selected from the group consisting of 2-phenoxyethyl acrylate, benzyl methacrylate, isobornyl acrylate, neopentyl glycol diacrylate, and 1,3-butyleneglycol dimethacrylate.

6. The functionalized optical article of claim 1, wherein each of the first thermoplastic film and the second thermoplastic film independently comprise a material selected from the group consisting of cellulose triacetate, polycarbonate, poly methacrylate, polyamide, nylon and polystyrene.

7. The functionalized optical article of claim 1, wherein the functional film is selected from the group consisting of a stretched thermoplastic elastomer film, a non-stretched thermoplastic elastomer film, a stretched thermoplastic urethane film, and a non-stretched thermoplastic urethane film.

8. The functionalized optical article of claim 1, wherein the functional film further comprises a photochromic material, a dichroic material, a photochromic-dichroic material, or a combination thereof.

9. The functionalized optical article of claim 1, wherein said laminating adhesive is laminated prior to curing.

10. The functionalized optical article of claim 1, wherein the at least one polyisocyanate and at least one polyol are provided at an isocyanate:hydroxide molar ratio ranging from 1.5:1 to 3:1.

* * * * *